July 24, 1934.  W. F. VAN LOENEN  1,967,601
APPARATUS FOR TREATING LIQUIDS WITH SOLIDS
Filed May 21, 1932

WILLIAM F. VAN LOENEN
INVENTOR

Paul W. Brutzman
ATTORNEY

Patented July 24, 1934

1,967,601

UNITED STATES PATENT OFFICE 1,967,601

APPARATUS FOR TREATING LIQUIDS WITH SOLIDS

William F. Van Loenen, Buena Park, Calif., assignor to L. Blake-Smith, San Francisco, Calif.

Application May 21, 1932, Serial No. 612,847

5 Claims. (Cl. 196—3)

An object of my invention is to provide an apparatus suitable for contacting granular solids with single or mixed liquids for producing in said liquid a chemical or physical change in condition.

An object of my invention is to provide an apparatus adapted to the treatment of emulsions with granular solid bodies which are insoluble in the constituents of the emulsion or in the resolution products thereof, or which are so slowly soluble as to maintain the granular form for a material period of time.

In two applications filed by me on May 21, 1932 under Serial Nos. 612,845 and 612,846, I have described and claimed two closely allied methods of treating emulsions with granular solids having a specific gravity differing from that of the emulsion, these methods comprising the gravitation of the solid to a position above or below an emulsion layer, the removal of the solid as a substantially separated mass to the vertically opposite side of said layer, and the release of the solids on said opposite side to cause their passage through said layer under the sole influence of gravitation.

In the copending applications I have shown diagrammatically, as a means of producing such functions, a cylindrical shell rotating on its horizontal axis, and the subject of the present invention is the apparatus thus briefly referred to.

This apparatus is shown in and its manner of functioning described in connection with the attached drawing, in which Fig. 1 is a side elevation of my improved treating apparatus, parts being broken away to show its internal construction;

These figures are described as applied to the treatment of a petroleum emulsion with a materially heavier granular solid.

Figure 2:
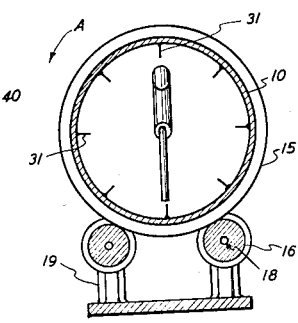
Fig. 2 is a cross-section on the line 2—2 of Fig. 1.
Figure 1:
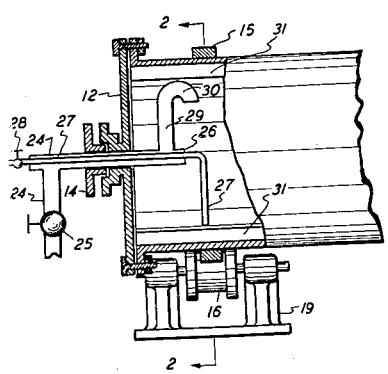
Figure 1:
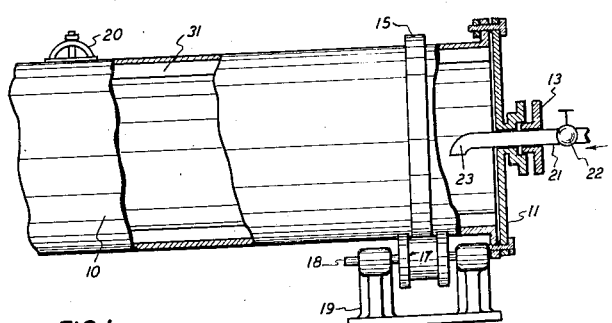

Referring to Figs. 1 and 2, 10 is a cylindrical shell, preferably of sheet steel, having removable heads 11 and 12. Stuffing boxes 13 and 14 are placed at the center of each head. The shell is reinforced by two or more rigid rings or bands 15—15, these bands running on the trunnions 16 and 17. The driving trunnion 17 may be revolved by the shaft 18 from a source of power not shown. Both trunnions may be supported by suitable bearings and bases indicated at 19—19. This method of supporting and rotating a horizontal cylinder is entirely conventional.

At any convenient place on the shell or on one of the heads may be placed a manhole 20 for the insertion of the treating agent and for cleaning the shell as required. A pipe 21 controlled by a valve 22 is passed through the stuffing box 13 for the purpose of introducing an intermittent or continuous stream of the liquid to be treated. This pipe is preferably turned downwardly within the shell, as indicated at 23. At the opposite end of the shell a pipe 24 is introduced through the stuffing box 14, this pipe being controlled by a valve 25. The inner end of this pipe should be sealed, as at 26, around a smaller pipe 27 which turns downwardly within the shell, and may be so arranged that its free end may be raised and lowered at will. This pipe extends outwardly through the pipe 24 and is controlled by a valve 28. Within the shell an upward projection 29 from the pipe 24 is also turned downwardly as at 30. The down pipe 27 serves to withdraw the heavier separated liquid from the lower part of the shell, either while revolving or when at rest, while the upper pipe 29 serves to withdraw the lighter separated liquid. The purpose of turning the ends of all these pipes downwardly is to prevent their being filled with subsiding solids.

Figure 3:
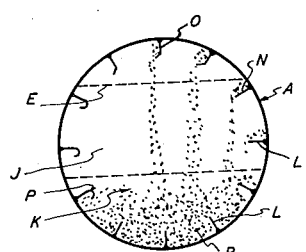
Fig. 3 is a cross-sectional diagram illustrating the functioning of the device.

Referring to the same figures, 31—31 are longitudinal vanes arranged on the interior of the shell. These vanes are for the purpose of lifting a heavy treating agent to a point above the horizontal center line of the shell and allowing it to fall back through the liquid body, or for skimming portions of a floating treating agent from the upper surface and conveying it to a lower level. Alternative forms of vane suitable for use under different conditions are shown at O and P in Fig. 3. While all the vanes shown are arranged longitudinally, they may run the entire length of the shell or may be in relatively short sections; they may be separated by circumferential ribs to form a pocketed or honeycomb structure, and they may be permanently attached, as by welding, or may be removably bolted to the interior of the shell. The vanes may be of sheet metal of suitable weight or may be of wire mesh, the latter permitting the draining away of excess fluid.

The shell itself may be a straight cylinder as shown or it may desirably be tapered at the discharge end, after the manner of a ball mill, and it may be round, polygonal or irregular in cross-section. For relatively small quantities it is also permissible to rotate a short cylinder end over end, after the manner of a barrel churn. Again, a cylindrical shell may be stationary and the lifting vanes or buckets placed on a frame revolved within the shell.

All such minor variations of form fall within the scope of my broad invention of apparatus, the functional characteristic of which is the removal of the treating agent from the position to which it moves by gravitation and its distribution through the portion of the liquid mass requiring treatment, while avoiding such agitation of the contents of the vessel as to prevent the formation and retention of horizontally defined layers of immiscible liquids.

Obviously, this apparatus may be operated at such speed as to produce a violent agitation of the liquid, and it is premised that its usefulness is limited to such speeds as will avoid undue agitation of the liquid body.

In utilizing the above described apparatus for the treatment of petroleum emulsion with a heavy solid such as sand, a sufficient quantity of the granular solid is placed within the closed shell and emulsion to be broken is introduced through the pipe 21, the shell being constantly rotated so as to produce an initial dispersion of the granules through the emulsion. The cylinder may be completely filled or it may be partially filled up to, say, from one-half to seven-eighths of its diameter, the optimum charge being variable according to the characteristics of the emulsion, the temperature of application and the form of vane used. When the cylinder has been filled to the desired height, the feed of emulsion may be interrupted while rotation is continued until the emulsion is completely or sufficiently broken. The rotation may then be stopped and the contents of the cylinder will be found in three layers, the lower consisting of granules, the next of water, and the highest of oil. Under some conditions a fourth layer of unbroken emulsion at the interface between oil and water may be tolerated. The granules are retained in the apparatus but the water may be withdrawn through the pipe 27 and when this layer is exhausted, free oil may be withdrawn through the same pipe and passed to a tank in which any entrained water drops may settle out. This constitutes a discontinuous operation of the apparatus, which is commercially undesirable and which is described for illustrative purposes only.

To operate the apparatus continuously a relatively slow feed of the emulsion is started when the initial charge is substantially resolved into its constituents and the feed so controlled that the entering emulsion will be completely or sufficiently broken by the time it reaches the outlet end of the apparatus. This feed may be continued indefinitely, water being withdrawn continuously through the pipe 27 and clear oil or oil containing suspended water drops being continuously withdrawn through the pipes 24 and 29.

Separate withdrawal of the products of resolution may, in some cases, restrict the output capacity of the apparatus by utilizing part of its storage capacity as settling space. I may therefore, as optional procedure, withdraw the resolution products through the same pipe, from such level as to allow a substantial quantity of water to remain in the shell, and effect the gravity separation in another vessel.

It is quite essential to the successful operation of this rotating form of apparatus that the speed be carefully controlled. Too rapid revolution will produce a turbulent condition in which the method ceases to function. As speed increases, centrifugal force causes the granular solid to travel farther and farther around the circumference of the shell before complete release; so that, at least when using a moderately straight form of vane, the solid may be discharged entirely on the rising side or may be distributed over the entire upper surface.

Speed also influences the cleansing of the grains in the water layer. Unless the vanes are so wide as to raise all the grains as fast as they subside, the entire mass of grains will be carried part way up the rising side and the excess will constantly roll back beneath the surface of the water layer, thus producing a desirable mutual abrasion of the grains. The extent of this abrasion is reduced by increasing rotative speed and/or the width of the vane, and is increased by reducing the speed and/or width of the vane or by carrying in the apparatus a greater bulk of grains. The object of abrasion is to remove from the solid grains a coating of emulsifying agent (clay, colloidal substances, lime soaps and similar bodies) which tends to form on the grains as they pass through the emulsion and coalesce the particles of dispersed liquid.

Speed also affects the behavior of the two layers. Counter-clockwise rotation tends to produce a clockwise rotation of the water layer by reason of the sliding or pouring of the solids down the rising side of the shell. Over a rather wide range of speed this rotation of the water layer may cause relatively large masses of water to become detached from the main body and circulate through the lower portion of the liquid layer. When so restrained as not to produce turbulence, this movement of water masses through the oil layer does not cause reemulsification and in many cases has a desirable effect in promoting resolution because of its assistance in cleansing the subsiding solids. If too little water is present in the lower layer, reemulsification may be produced and in initiating a treatment it is often desirable to introduce water into the apparatus to the extent of from 15% to 30% of the charge, this quantity thereafter being maintained by withdrawal of only such quantity of water as is separated from the emulsion.

The apparatus may also be utilized for the treatment of emulsions or other liquids with solid agents specifically lighter than the emulsion, such, for instance, as coarse sawdust. In this use the apparatus functions in the same manner but in a reverse direction. That is to say, the solid collects in a floating layer on the upper surface of the emulsion and as the rotating vanes encounter this layer, portions of the solid are drawn downwardly and are discharged into the liquid body at any preferred lower level, either immediately beneath the emulsion layer or within the water layer. It is desirable, though not essential, to form the vanes for this use of wire mesh or other permeable material to avoid the entrainment of oil or emulsion and its discharge below the water level.

Figure 4:
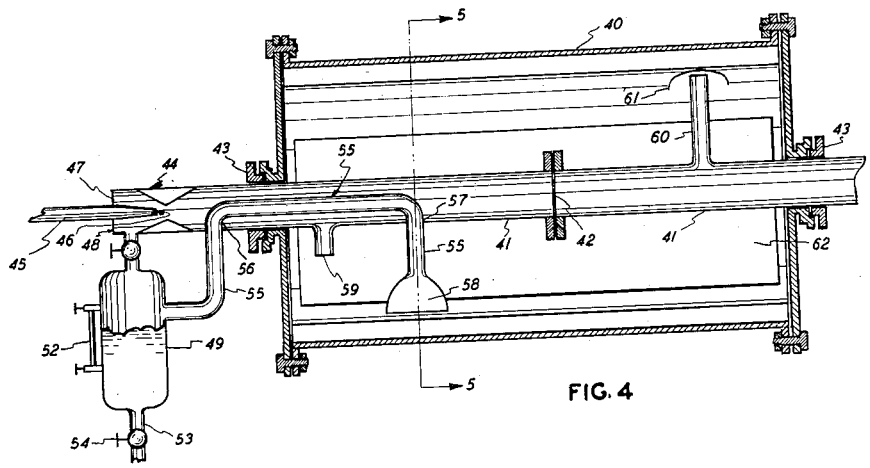
Fig. 4 is a longitudinal section of the treater in a slightly modified form.
Figure 5:
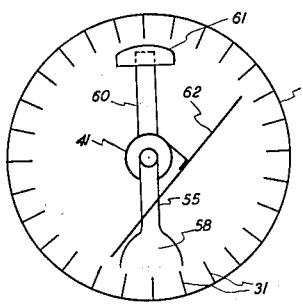
Fig. 5 is a cross-section on the line 5—5 of Fig. 4.

Figs. 4 and 5 illustrate a modification of the form shown in Figs. 1 and 2, in which provision is made for withdrawing water without removing solid grains and also for separating and returning any oil or unbroken emulsion which may be removed from the shell along with the water. Either modification may also include a baffle plate for retarding circulatory movement of the water within the shell.

Referring to Figs. 4 and 5, 40 is a shell of any form rotatable on its longitudinal axis. Means for supporting the shell are not shown but may be trunnions similar to those indicated at 16 and 17 in Figs. 1 and 2. Through the center of the shell passes a pipe 41 which is divided into two noncommunicating parts, as by the blank flange 42. This pipe is fixed in position concentric with the rotative axis of the shell and passes through stuffing boxes 43—43.

At the left end (as illustrated in Fig. 4) of pipe 41 is formed a constriction or venturi 44 and the emulsion required to feed the apparatus is introduced under pressure into this constriction through a pipe 45 terminating in a nozzle 46. Pipe 45 being sealed into the end of pipe 41, as indicated at 47, a reduction in pressure is produced in space 48 back of the venturi.

The upper end of a separating vessel 49 is placed in communication with space 48 by a pipe 50 controlled by a valve 51, and is also provided with a gauge glass 52 and a water drain pipe 53 controlled by a valve 54.

A medial portion of the separator 49 communicates with the interior of shell 40 by means of a pipe 55 which is sealed into the wall of pipe 41 as at 56 and 57, this pipe preferably terminating in a bell 58, the lower end of which is open. The use of this bell, the purpose of which is to retard velocity of entering water, is optional.

Within shell 40, and preferably close to the left head, a pipe 59 branches from pipe 41. At the opposite end of the shell an up-ward-looking pipe 60 is branched from pipe 41 and may optionally be covered by a shield 61 to prevent the entry of subsiding grains. A baffle plate 62 may be secured to pipe 41 or otherwise supported in a fixed or adjustable position, this plate also being optional.

This apparatus has the vanes 31 or their equivalent and is used in the same general manner as the form shown in Figs. 1 and 2. It will therefore be described only as regards the details in which its operation differs from that of the form shown in such figures.

Wet oil (emulsion) enters the system through pipe 45 and through pipes 41 and 59 makes its way into the inlet (left) end of the slowly revolving shell. It will be noted that entering oil cannot pass the blank flange 42.

As water separates from the emulsion, it passes through pipe 55 into separator 49, where any entrained oil or emulsion rises to the surface, the gauge glass 52 indicating the parting line between oil and water. The water is withdrawn through pipe 53 at such rate as to maintain the desired water level in the shell, and by opening valve 51 to the necessary extent any oil which may accompany the water will be drawn into the space 48 and thence returned to the shell to be retreated. Demulsified oil passes upward beneath the shield 61 and overflows the upper end of pipe 60, passing thence into the right-hand end of pipe 41 and thence out of the system.

The use of the baffle plate 62 is to prevent excessive rotation of the separated liquid layers and to ensure the retention of a definite and controlled water layer.

It will be obvious that the described arrangement for withdrawal of water and return of entrained oil may be applied to any form of apparatus, whether the shell be rotative or fixed, while the baffle described is useful only in those forms in which the shell rotates on its horizontal axis.

The rotative forms of treating apparatus illustrated in Figs. 1, 2, 4, and 5 have certain advantages which do not obtain in any form in which the shell is stationary. Thus, the water layer is less disturbed, particularly when the baffle plate is used. The amount of suspended water and the rate of circulation of solids through the emulsion may be controlled by varying the relative speed. The solids may be distributed over and through the emulsion layer more uniformly than is possible with other apparatus, or may be placed over only a part of the area if preferred. The power expenditure is extremely low; no moving parts can become frozen by the formation of a dense granular pack; the grains are tumbled beneath the water in such manner as to secure the most effective removal of adherent coatings while reducing mutual abrasion and consequent formation of fines to a minimum; there is the least possible wear due to friction of grains against metallic parts, and the crushing of grains to undesired smaller sizes is entirely avoided.

I claim as my invention:

1. Apparatus for resolving emulsions with granular solids: a substantially closed drum horizontally positioned for rotation about its axis; means for introducing liquid emulsion to and for withdrawing liquid resolution products from said drum; means within said drum for moving and distributing said solids within said liquids, and means within said drum and coacting with said drum for maintaining said liquids substantially quiescent.

2. Apparatus for resolving emulsions with granular solids: a substantially closed drum and means for revolving said drum about its horizontal axis; vanes affixed longitudinally to the interior of said drum, said vanes being so formed and arranged as to lift granular substances from the lower part of said drum to a level higher than that determined by the angle of repose of said granules on a flat vane radially arranged; means for introducing emulsion into said drum; and pipe means independent of said introduction means for separately withdrawing oil from the upper portion of said drum and water from the lower portion thereof.

3. Apparatus for resolving emulsions with granular solids: a substantially closed drum and means for revolving said drum about its horizontal axis; vanes affixed longitudinally to the interior of said drum; means for introducing emulsion into and for separately withdrawing resolution products from said drum, and a longitudinally arranged stationary baffle extending from an upper portion to a lower portion of said drum.

4. Apparatus for continuously resolving emulsions with granular solids: a substantially closed drum and means for rotating said drum about its horizontal axis; means within said drum and revolving therewith for lifting said solids from the bottom of said drum and for releasing said solids at a higher level; pipe means for withdrawing the lighter liquid of said emulsion from said drum; pipe means for introducing emulsion into said drum; pipe means cooperating with separating means for withdrawing the heavier liquid of said emulsion from said drum, and a channel affording communication between the upper portion of said separating means and said introducing means for returning to said drum any lighter liquid entrained in and withdrawn with said heavier liquid.

5. In apparatus substantially as and for the purpose set forth in claim 4, a Venturi tube and jet in said introduction means.

WILLIAM F. VAN LOENEN.